(12) United States Patent
Liu

(10) Patent No.: US 12,676,392 B2
(45) Date of Patent: Jul. 7, 2026

(54) CAP ASSEMBLY, BATTERY CELL, BATTERY AND ELECTRIC-POWERED DEVICE

(71) Applicant: CONTEMPORARY AMPEREX TECHNOLOGY CO., LIMITED, Ningde (CN)

(72) Inventor: Caisheng Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/773,332

(22) Filed: Jul. 15, 2024

(65) Prior Publication Data

US 2024/0372233 A1     Nov. 7, 2024

Related U.S. Application Data

(63) Continuation of application No. PCT/CN2022/110605, filed on Aug. 5, 2022.

(30) Foreign Application Priority Data

Jul. 7, 2022    (CN) .......................... 202221731363.9

(51) Int. Cl.
*H01M 50/636* (2021.01)
*H01M 50/375* (2021.01)
(Continued)

(52) U.S. Cl.
CPC ....... *H01M 50/636* (2021.01); *H01M 50/375* (2021.01); *H01M 50/392* (2021.01); *H01M 50/159* (2021.01)

(58) Field of Classification Search
None
See application file for complete search history.

(56) References Cited

U.S. PATENT DOCUMENTS

| | | | |
|---|---|---|---|
| 2017/0149047 A1 | 5/2017 | Guen | |
| 2019/0237743 A1 | 8/2019 | Zhou et al. | |
| 2023/0065566 A1* | 3/2023 | Sun ..................... | H01M 50/209 |

FOREIGN PATENT DOCUMENTS

| | | |
|---|---|---|
| CN | 204596850 U | 8/2015 |
| CN | 205790092 U | 12/2016 |

(Continued)

OTHER PUBLICATIONS

International Search Report dated Dec. 19, 2022 for Application No. PCT/CN2022/110605.

(Continued)

*Primary Examiner* — Amanda J Barrow
(74) *Attorney, Agent, or Firm* — Ladas & Parry, LLP

(57)     ABSTRACT

A cap assembly, a battery cell, a battery and an electric-powered device are disclosed. The cap assembly includes: a cap plate, including a liquid injection hole; and a blocking device, disposed on a side of the cap plate facing an electrode assembly of a battery cell and at least partially covering the liquid injection hole, the blocking device including a vent hole, the vent hole being adapted for communicating the liquid injection hole with a space located at a side of the blocking device facing away from the cap plate. By providing the blocking device below the liquid injection hole, the electrolyte can be blocked and prevented from directly flowing out through the liquid injection hole during formation process. When injecting electrolyte through the liquid injection hole, the injected liquid can be prevented from directly spraying onto the electrode assembly and thus causing displacement or deformation of the electrode assembly.

12 Claims, 4 Drawing Sheets

(51) Int. Cl.
_H01M 50/392_        (2021.01)
_H01M 50/159_        (2021.01)

(56)                References Cited

FOREIGN PATENT DOCUMENTS

| | | | | |
|---|---|---|---|---|
| CN | 206992215 U | 2/2018 | | |
| CN | 207320226 U | 5/2018 | | |
| CN | 207800664 U | 8/2018 | | |
| CN | 207938663 U | 10/2018 | | |
| CN | 208608247 * | 3/2019 | ............ | Y02E 60/10 |
| CN | 208608247 U | 3/2019 | | |
| CN | 208848999 U | 5/2019 | | |
| CN | 110707281 A | 1/2020 | | |
| CN | 211957706 U | 11/2020 | | |
| CN | 112701428 A | 4/2021 | | |
| CN | 112701428 B | 8/2021 | | |
| CN | 214542473 U | 10/2021 | | |
| CN | 215418522 U | 1/2022 | | |
| CN | 114300772 A | 4/2022 | | |
| JP | 2015-056357 * | 3/2015 | ............ | Y02E 60/10 |
| JP | 2015056357 A | 3/2015 | | |
| JP | 2017076475 A | 4/2017 | | |
| JP | 2022088648 A | 6/2022 | | |

OTHER PUBLICATIONS

Written Opinion dated Dec. 19, 2022 for Application No. PCT/CN2022/110605.
Chinese Office for expedited preliminary examination dated Jul. 5, 2022 for YS03820222000318.
Extended European Search Report from corresponding European Patent Application No. 22949977.7 dated Jun. 10, 2025.

* cited by examiner

<u>1</u>

<u>2</u>

30

30

CAP ASSEMBLY, BATTERY CELL, BATTERY AND ELECTRIC-POWERED DEVICE

CROSS REFERENCE TO RELATED APPLICATIONS

The present application is a continuation of PCT Application No. PCT/CN2022/110605, filed on Aug. 5, 2022 and claiming priority of the Chinese patent application 202221731363.9 filed on Jul. 7, 2022, both of which are incorporated by reference herein in their entireties.

TECHNICAL FIELD

The present application relates to the technical field of batteries, and particularly to a cap assembly, a battery cell, a battery and an electric-powered device.

BACKGROUND

As a new type of secondary battery, lithium-ion batteries have advantages of high energy density and power density, long cycle life, good safety, and environmental protection. With the development of modern society and enhancement of people's environmental awareness, more and more devices use lithium batteries as power sources, such as mobile phones, laptops, electric tools, and electric vehicles, which provide a broad space for the application and development of the lithium batteries.

Currently, safety of batteries is receiving increasing attention. The amount of electrolyte in a battery cell is related to long-term stable operation of the battery, so it is necessary to avoid loss of the electrolyte during manufacturing and operation of the battery cell.

SUMMARY

In view of the above issues, the present application provides a cap assembly, a battery cell, a battery, and an electric-powered device, which can reduce loss of electrolyte and improve safety of the battery cell during operation.

On a first aspect, the embodiments of the present disclosure provide a cap assembly, including:

a cap plate, including a liquid injection hole;

a blocking device, disposed on a side of the cap plate facing an electrode assembly of a battery cell and at least partially covering the liquid injection hole, the blocking device including a vent hole, the vent hole being adapted for communicating the liquid injection hole with a space located at a side of the blocking device facing away from the cap plate, the blocking device including a blocking plate, the blocking plate being connected with the cap plate, and the blocking plate being provided with the vent hole which penetrates through the blocking plate, wherein a plurality of blocking plates are provided, the plurality of blocking plates are spaced apart in a first direction, and the first direction is a direction from the electrode assembly towards the cap plate.

In the technical solutions of the embodiments of the present application, by providing the blocking device below the liquid injection hole, the electrolyte can be blocked and prevented from directly flowing out through the liquid injection hole during the formation process. Moreover, when injecting the electrolyte through the liquid injection hole, the injected liquid can be prevented from directly spraying onto the electrode assembly and thus causing displacement or deformation of the electrode assembly, thereby improving safety of an electrolyte injection process. Further, by providing the blocking plate, at least part of the electrolyte can be prevented from flowing out through the liquid injection hole. Moreover, the blocking plate is provided with the vent hole, gases inside the battery cell can be discharged. The above configuration can ensure normal discharge of gases while preventing loss of the electrolyte. Further, by providing a plurality of blocking plates, multiple blocking measures are provided to prevent discharge of the electrolyte during the formation process, thereby further enhancing the effect of reducing loss of the electrolyte.

In some embodiments, the blocking plate includes a receiving cavity on a side facing the cap plate, and an orthographic projection of the receiving cavity on the cap plate at least partially covers the liquid injection hole. By providing the receiving cavity, a buffer space can be formed when injecting the electrolyte through the liquid injection hole for accommodating the electrolyte, thereby preventing the liquid from directly spraying towards the electrode assembly, and reducing impact of the electrolyte on the electrode assembly.

In some embodiments, the blocking plate includes a side plate and a bottom plate, the side plate is disposed around an outer periphery of the liquid injection hole, the bottom plate is connected to the side plate and opposite to the liquid injection hole, and the side plate and the bottom plate enclose and form the receiving cavity in a cylindrical shape. By providing the cylindrical receiving cavity, the sealing nail in the liquid injection hole can be accommodated and positioned, thereby preventing the sealing nail from falling off, avoiding damage of the blocking plate caused by movements of the sealing nail during the electrolyte injection or vacuuming in the formation process, and thus improving safety of the blocking device.

In some embodiments, a plurality of vent holes are provided. By providing the plurality of vent holes, efficiency of gas discharge during the formation process can be increased.

In some embodiments, the plurality of vent holes are arranged on the blocking plate at uniform intervals. The above configuration can ensure uniform discharge of the gases, improve balancing of forces on the blocking plate, increase efficiency of the gas discharge, and extend service life of the blocking plate.

In some embodiments, diameters of the plurality of blocking plates decrease gradually in the first direction. By providing the blocking plates with different diameters, the efficiency of gas discharge can be improved while facilitating connection between the blocking plate and the cap plate.

In some embodiments, a quantity Q of the blocking plates is in a range of $2 \leq Q \leq 5$. By providing a reasonable quantity of blocking plates, the blocking effect can be ensured, while a weight of the cap assembly can be reduced and energy density of the battery cell can be ensured.

In some embodiments, the vent holes on adjacent two blocking plates are arranged in a staggered manner. By staggering the vent holes, a path of the electrolyte flowing between adjacent blocking plates is extended, and a discharge velocity of the electrolyte is reduced.

In some embodiments, all the vent holes on each of block plates have equal apertures, and apertures of the vent holes on the plurality of blocking plates decrease gradually in the first direction. By providing the apertures of the vent holes to gradually decrease in a discharging direction of the electrolyte, the resistance to the electrolyte when the electrolyte is discharged can be gradually increased, and amount of the discharged electrolyte can be reduced.

In some embodiments, the blocking device further includes a liquid absorbing assembly disposed in the receiving cavity, and the liquid absorbing assembly is formed as a structure with multiple holes. By providing the liquid absorbing assembly within the receiving cavity, the electrolyte can be temporarily absorbed in the holes of the liquid absorbing assembly, and the electrolyte can flow back after the formation process is completed, thereby reducing loss of the electrolyte in the formation process.

In some embodiments, the liquid absorbing assembly includes a first liquid absorbing piece disposed between the blocking plate and the liquid injection hole, the first liquid absorbing piece is provided with a plurality of liquid absorbing holes on its surface, and the first liquid absorbing piece has a size larger than an aperture of the liquid injection hole. By providing the size of the first liquid absorbing piece to be larger than the aperture of the liquid injection hole, it can prevent the first liquid absorbing piece from being discharged through the liquid injection hole.

In some embodiments, the liquid absorbing assembly includes a second liquid absorbing piece disposed between adjacent two blocking plates, the second liquid absorbing piece is provided with a plurality of liquid absorbing holes on its surface, and the second liquid absorbing piece has a size larger than the apertures of the vent holes on the adjacent two blocking plates. By providing the size of the second liquid absorbing piece to be larger than the apertures of the vent holes, it can prevent the second liquid absorbing piece from falling off through the vent holes, and thus prevent the second liquid absorbing piece from damaging the electrode assembly.

On a second aspect, the present application further provides a battery cell, including the cap assembly of the above embodiments.

On a third aspect, the present application further provides a battery including the battery cell of the above embodiments.

On a fourth aspect, the present application further provides an electric-powered device, including the battery of the above embodiments, and the battery is adapted to provide electrical energy.

The above description is only a summary of the technical solutions of the present application. In order to understand the technical means of the present application more clearly so that it can be implemented in accordance with the contents of the specification, and also in order to make the above and other purposes, features, and advantages of the present application more obvious and understandable, the specific implementations of the present application are listed below.

BRIEF DESCRIPTION OF THE DRAWINGS

The features, advantages, and technical effects of exemplary embodiments of the present application will be described below with reference to the accompanying drawings.

Figures 1, 2:
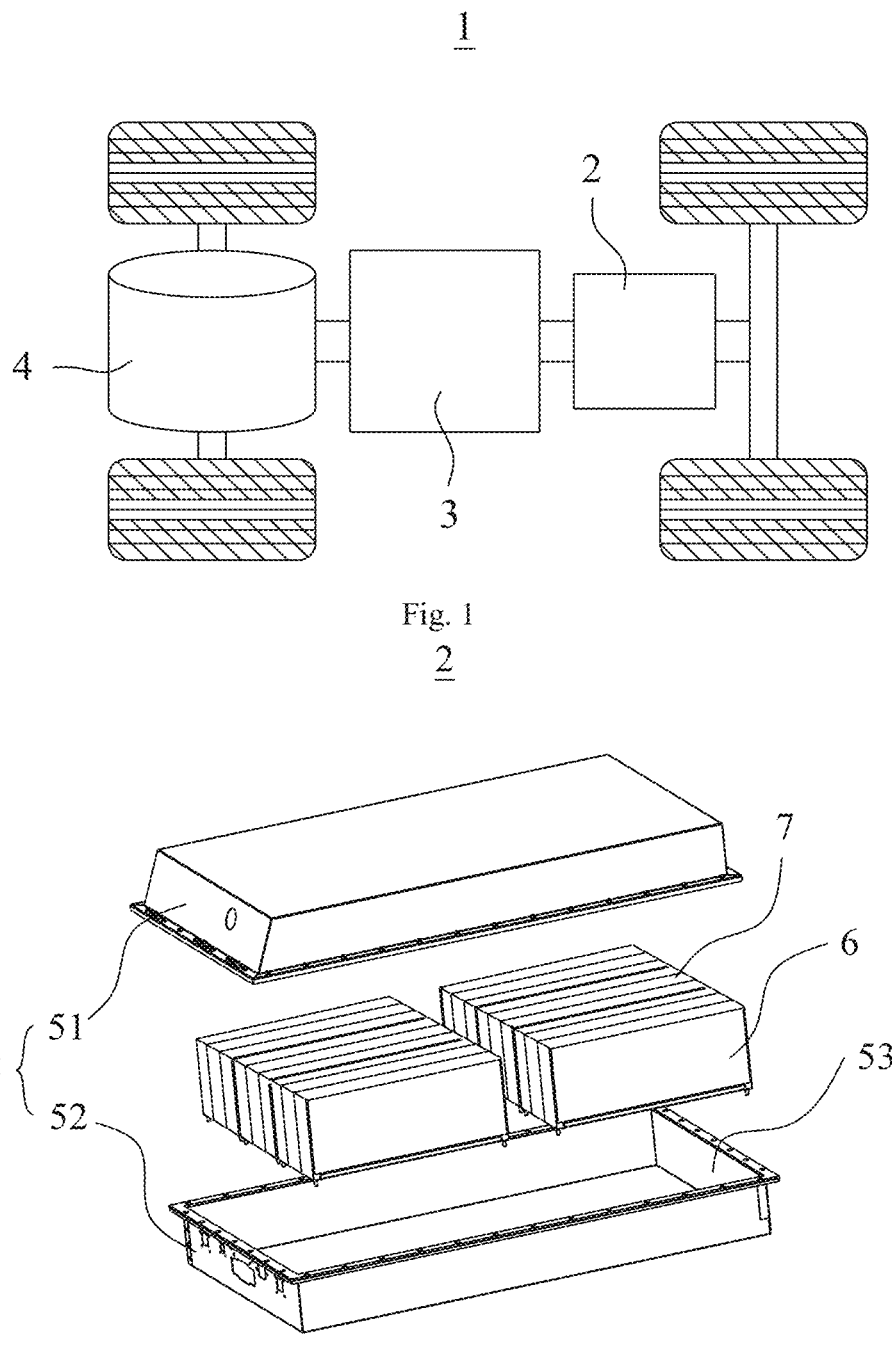
FIG. 1 is a structural schematic diagram of a vehicle provided in some embodiments of the present application.
FIG. 2 is an explosive schematic diagram of a battery provided in some embodiments of the present application.

The accompanying drawings are not necessarily drawn to the actual scale.

Reference numerals in the specific embodiments:

1, vehicle; X, first direction; 2, battery; 3, controller; 4, motor; 5, housing; 51, first portion; 52, second portion; 53, receiving space; 6, battery module; 7, battery cell; 10, electrode unit; 11, electrode assembly; 20, shell; 21, opening; 30, cap assembly; 31, electrode terminal; 32, pressure relief mechanism; 301, cap plate; 302, blocking device; 303, liquid injection hole; 304, vent hole; 305, blocking plate; 306, receiving cavity; 307, side plate; 308, bottom plate; 309, first blocking plate; 310, second blocking plate; 311, third blocking plate; 312, liquid absorbing assembly; 313, first liquid absorbing piece; 314, second liquid absorbing piece.

DETAILED DESCRIPTION

In order to make the purpose, technical solutions and advantages of the embodiments of the present application clearer, the technical solutions in the embodiments of the present application will be clearly described below in combination with the accompanying drawings in the embodiments of the present application. Obviously, the described embodiments are a part of the embodiments of the present application, not all of them. Based on the embodiments in the present application, all other embodiments obtained by ordinary skilled person in the art without creative labor fall within the protection scope of the present application.

Unless otherwise defined, all technical and scientific terms used in the present application have the same meanings as those commonly understood by the person skilled in the art of the present application; the terms used in the description of the present application are only intended to describe specific embodiments while not limit the present application; the terms "include" and "have" in the description, claims and the above description of accompanying drawings of the present application, and any variations thereof, are intended to cover non-exclusive inclusion. The terms "first", "second", etc. in the description, claims or the above description of accompanying drawings of the present application are used to distinguish different objects, rather than to describe specific sequences or primary and secondary relationships.

When referring to "embodiment" in the present application, it means that specific features, structures, or characteristics described in combination with said embodiment can be included in at least one embodiment of the present application. The phrase appearing in various positions in the description does not necessarily refer to the same embodiment, nor is it an independent or alternative embodiment that is mutually exclusive with other embodiments.

In the description of the present application, it should be noted that unless otherwise specified and limited, the terms "installation", "connection", "coupling", and "attachment" should be broadly understood, for example, they can be fixed connections, detachable connections, or integrated connections; they can be direct connections, or indirect connections through intermediate mediums, or can be internal connections between two components. For ordinary skilled person in the art, the specific meanings of the above terms in the present application can be understood according to specific circumstances.

In the present application, the term "and/or" is only a description of association relationship of associated objects, indicating that there can be three types of relationships, for example, A and/or B can indicate the presence of A alone, the presence of A and B simultaneously, and the presence of B alone. In addition, the character "/" in the present application generally indicates that the associated objects before and after the character are in an "or" relationship.

In the embodiments of the present application, the same reference numerals represent the same components, and for simplicity, detailed descriptions of the same components are omitted in different embodiments. It should be understood that the thickness, length, width, and other dimensions of various components as well as the overall thickness, length, width, and other dimensions of the integrated device in the embodiments of the present application shown in the accompanying drawings, are only illustrative examples and should not constitute any limitations in the present application.

The term "a plurality of" in the present application refers to two or more (including two).

In the present application, a battery cell may include a lithium ion secondary battery cell, a lithium ion primary battery cell, a lithium sulfur battery cell, a sodium-lithium ion battery cell, a sodium ion battery cell, a magnesium ion battery cell, or the like, and the embodiments of the present application do not limit this aspect. The battery cell can be in a shape of a cylinder, a flat body, a rectangular cuboid or in other shapes, and the embodiments of the present application do not limit this aspect. Battery cells are generally divided into three types by packaging: cylindrical battery cells, square battery cells, and soft pack battery cells. The embodiments of the present application do not limit this aspect.

The battery mentioned in the embodiments of the present application refers to a single physical module that includes one or more battery cells to provide higher voltage and capacity. For example, the battery mentioned in the present application may include battery modules, battery packs, or the like. The battery generally includes a casing for packaging one or more battery cells. The casing can prevent liquids or other foreign matters from affecting charging or discharging of the battery cells.

The battery cell includes an electrode unit and electrolyte, the electrode unit includes at least one electrode assembly, and the electrode assembly includes a positive electrode plate, a negative electrode plate, and a separator. The battery cell operates mainly relying on movement of metal ions between the positive and negative electrode plates. The positive electrode plate includes a positive current collector and a positive active substance layer, and the positive active substance layer is coated on a surface of the positive current collector; the positive current collector includes a positive current collecting portion and a positive protruding portion protruding from the positive current collecting portion, the positive current collecting portion is coated with the positive active substance layer, at least part of the positive protruding portion is not coated with the positive active substance layer, and the positive protruding portion serves as a positive tab. Taking the lithium ion battery cell as an example, the positive current collector can be made of aluminum, and the positive active substance layer includes positive active substance, which may be lithium cobalt oxide, lithium iron phosphate, ternary lithium, lithium manganese oxide, or the like. The negative electrode plate includes a negative current collector and a negative active substance layer, and the negative active substance layer is coated on a surface of the negative current collector; the negative current collector includes a negative current collecting portion and a negative protruding portion protruding from the negative current collecting portion, the negative current collecting portion is coated with the negative active substance layer, at least part of the negative protruding portion is not coated with the negative active substance layer, and the negative protruding portion serves as a negative tab. The negative current collector can be made of copper, the negative active substance layer includes negative active substance, and the negative active substance can be carbon or silicon. In order to ensure that there is no melting in the negative tab when high current flows through it, a plurality of negative tabs are provided and stacked together. The separator can be made of PP (polypropylene) or PE (polyethylene), or the like. Further, the electrode assembly may be formed as a wound structure or a stacked structure, and the embodiments of the present application are not limited to this.

In the production process of the battery, after installation of various components in the battery cell is completed, a formation process is required to form a solid electrolyte interface film (which is referred to as SEI film for abbreviation) on a surface of the electrode. In order to form a complete SEI film, it is necessary to charge the battery cell with a low current after an electrolyte injection is completed, which is known as film formation. The process of formation will be accompanied by generation of gases. These gases will have a negative impact on the formation rate. Meanwhile, if these gases fail to be discharged timely and remain in an interior of the battery cell, they will decrease conversion efficiency of the battery cell subsequently. This is because when gases appear in the battery cell, some part of the electrode plates will be caused to be exposed, unable to be soaked in the electrolyte, and thus unable to perform effective electricity conversion, resulting in that the efficiency of the battery cell will be lower than expected. In order to timely discharge the gases generated during film formation and improve efficiency of formation, it is necessary to maintain a high temperature and negative pressure environment inside the battery cell during the formation process.

The applicant has found that in the high temperature and negative pressure environment, some of the electrolyte in the battery cell may be extracted by a negative pressure mechanism, causing loss of the electrolyte. Moreover, the boiling point of the electrolyte will vary with the level of the negative pressure, and during the formation process, some of the electrolyte may become gaseous and be extracted along with the gases generated during the formation process, causing further loss of the electrolyte.

In view of this, the embodiments of the present application provide a cap assembly provided with a blocking device. The blocking device is disposed on a side of a cap plate facing an electrode assembly of the battery cell and at least partially covers a liquid injection hole, the blocking device includes a vent hole, which is adapted for communicating the liquid injection hole with a space located at a side of the blocking device facing away from the cap plate. Moreover, a plurality of blocking plates are provided and spaced apart in a first direction, and the first direction is a direction from the electrode assembly towards the cap plate.

In the technical solutions of the embodiments of the present application, by providing the blocking device below the liquid injection hole, the electrolyte can be blocked during the formation process to prevent it from directly flowing out through the liquid injection hole. Moreover, when injecting the electrolyte through the liquid injection hole, the injected liquid can be prevented from directly spraying onto the electrode assembly and thus causing displacement or deformation of the electrode assembly, thereby improving safety of the electrolyte injection process. Further, by providing a plurality of blocking plates, multiple blocking measures are provided to prevent discharge of the electrolyte during the formation process, thereby further enhancing the effect of reducing loss of the electrolyte.

The technical solutions described in the embodiments of the present application are applicable to the battery and the electric-powered device using the battery. The electric-powered device can be a vehicle, a mobile phone, a portable device, a laptop, a ship, a spacecraft, an electric toy, an electric tool, and so on. The vehicle can be a fuel powered vehicle, a gas powered vehicle, or a new energy vehicle, and the new energy vehicle can be a pure electric vehicle, a hybrid electric vehicle, an extended range vehicle, or the like; the spacecraft includes an airplane, a rocket, a space shuttle, a space ship, and the like; the electric toy includes a stationary or mobile electric toy, such as a game machine, an electric car toy, an electric ship toy, an electric plane toy, and the like; the electric tool includes a metal cutting electric tool, a grinding electric tool, an assembling electric tool and a railway electric tool, such as an electric drill, an electric grinder, an electric wrench, an electric screwdriver, an electric hammer, an electric impact drill, a concrete vibrator and an electric planer. There are no particular limitations on the above-mentioned electric-powered devices in the embodiments of the present application.

For the convenience of description, the following embodiments are described by taking a vehicle as an example of the electric-powered device.

FIG. 1 is a structural schematic diagram of a vehicle provided in some embodiments of the present application. As shown in FIG. 1, a vehicle 1 is provided with a battery 2 in its interior, and the battery 2 can be installed at a bottom, head, or rear of the vehicle 1. The battery 2 can be adapted for supplying electrical power to the vehicle 1, for example, the battery 2 can serve as an operating power source of the vehicle 1.

The vehicle 1 may further include a controller 3 and a motor 4, the controller 3 is adapted to control the battery 2 to supply electrical power to the motor 4, for example, for satisfying working electrical power requirements of the vehicle 1 for starting, navigation, and travelling.

In some embodiments of the present application, the battery 2 can not only serve as the operating power source for the vehicle 1, but also as a driving power source for the vehicle 1, replacing or partially replacing fuel or natural gas to provide driving power for the vehicle 1.

FIG. 2 is an explosive schematic diagram of a battery provided in some embodiments of the present application. As shown in FIG. 2, the battery 2 includes a housing 5 and a battery cell 7, and the battery cell 7 is accommodated within the housing 5.

The housing 5 is adapted to accommodate the battery cell 7, and the housing 5 can be formed as various structures. In some embodiments, the housing 5 may include a first portion 51 and a second portion 52, the first portion 51 and the second portion 52 cover and close each other, and the first portion 51 and the second portion 52 define a receiving space 53 for accommodating the battery cell 7. The second portion 52 can be formed as a hollow structure with an opening at one end, the first portion 51 is formed as a plate-like structure, and the first portion 51 covers and closes a side with the opening of the second portion 52 to form the housing 5 with the receiving space 53; or, each of the first portion 51 and the second portion 52 may be formed as a hollow structure with an opening on one side, and a side with the opening of the first portion 51 is covered by a side with opening of the second portion 52 to form the housing 5 with the receiving space 53. Certainly, the first portion 51 and the second portion 52 can be formed in various shapes, such as cylinders, and rectangles.

In order to improve the sealing performance between the first portion 51 and the second portion 52 after they are connected, a sealing element such as sealant, a sealing ring, can further be installed between the first portion 51 and the second portion 52.

Assuming that the first portion 51 covers and closes the second portion 52 on a top of the second portion 52, the first portion 51 can also be referred to as an upper housing cover, and the second portion 52 can also be referred to as a lower housing body.

In the battery 2, there may be one battery cell 7, or may be a plurality of battery cells 7. If there are a plurality of battery cells 7, the plurality of battery cells 7 can be connected in series, in parallel, or in hybrid, where "in hybrid" means that the plurality of battery cells 7 are connected both in series and in parallel. The plurality of battery cells 7 can be directly connected in series, in parallel, or in hybrid, and then an integrity composed of the plurality of battery cells 7 can be received in the housing 5; certainly, it is also available that the plurality of battery cells 7 are connected in series, in parallel, or in hybrid to form battery modules 6 at first, and then a plurality of battery modules 6 are connected in series, in parallel, or in hybrid to form an integrity, which is accommodated in the housing 5.

Figure 3:
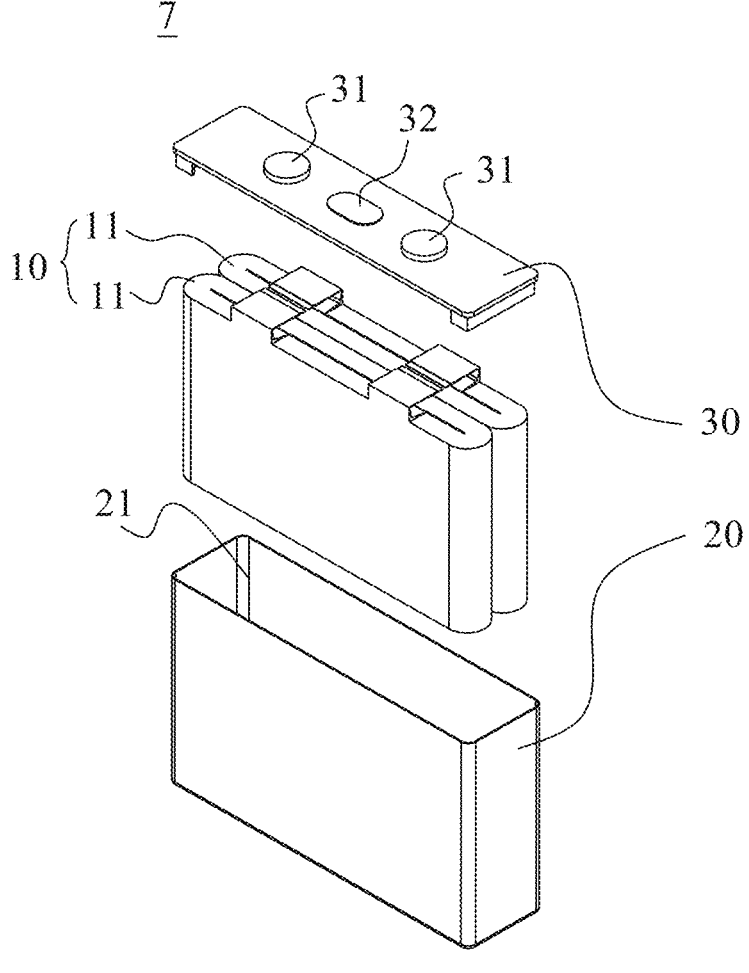
FIG. 3 is an explosive, schematic diagram of a battery cell in a battery provided in some embodiments of the present application.

FIG. 3 is an explosive schematic diagram of the battery cell 7 in the battery provided in some embodiments of the present application. In some embodiments, there are a plurality of battery cells 7, which are connected in series, in parallel, or in hybrid to form battery modules 6. A plurality of battery modules 6 are then connected in series, in parallel, or in hybrid to form an integrity, which is accommodated in the housing.

A plurality of battery cells 7 in the battery module 6 can be electrically connected through a busbar, to achieve parallel, series, or hybrid connection of the plurality of battery cells 7 in the battery module 6.

The battery cell 7 in the embodiments of the present application includes an electrode unit 10, a shell 20, and a cap assembly 30. The shell 20 includes an opening 21, the electrode unit 10 is accommodated within the shell 20, and the cap assembly 30 is adapted for connecting with the shell 20 and covering and closing the opening 21.

The electrode unit 10 includes at least one electrode assembly 11. The electrode assembly 11 includes a positive electrode plate, a negative electrode plate, and a separator. The electrode assembly 11 can be an electrode assembly of a wound type, an electrode assembly of a stacked type, or an electrode assembly of other types.

In some embodiments, the electrode assembly 11 is an electrode assembly of a wound type. The positive electrode plate, the negative electrode plate, and the separator are all formed as strip structures. The embodiments of the present application can sequentially stack the positive electrode plate, the separator and the negative electrode plate and wind them for more than two turns to form the electrode assembly 11.

In some other embodiments, the electrode assembly 11 is an electrode assembly of a stacked type. Specifically, the electrode assembly 11 includes a plurality of positive electrode plates and a plurality of negative electrode plates, and the positive electrode plates and negative electrode plates are alternately stacked in a direction parallel to a thickness direction of the positive electrode plates and a thickness direction of the negative electrode plates.

The electrode unit 10 includes at least one electrode assembly 11. That is to say, in the battery cell 7, there may be one or more electrode assemblies 11 accommodated within the shell 20.

The shell 20 is formed as a hollow structure with an opening on one side. The cap assembly 30 covers and closes the shell 20 at the opening and forms a sealed connection with the shell 20, so as to form a containing cavity for accommodating the electrode unit 10 and the electrolyte.

The shell 20 can be formed in various shapes, such as a cylinder, and a cuboid. The shape of the shell 20 can be determined depending on the specific shape of the electrode unit 10. For example, if the electrode unit 10 is formed as a cylindrical structure, a cylindrical shell may be selected; if the electrode unit 10 is formed as a cubic structure, a cubic shell may be selected. Certainly, the cap assembly 30 also may be of various structures, such as a plate-like structure or a hollow structure with an opening on one end. For example, the shell 20 is formed as a cubic, the cap assembly 30 is formed as a plate-like structure, and the cap assembly 30 covers and closes the opening at the top of the shell 20.

The cap assembly 30 further includes an electrode terminal 31. In some embodiments, two electrode terminals 31 are provided, and are respectively defined as a positive electrode terminal and a negative electrode terminal. The positive electrode terminal and the negative electrode terminal are respectively adapted for electrically connecting with the positive and negative tabs of the electrode assembly 11 to output current generated by the electrode assembly 11.

The cap assembly 30 further includes a pressure relief mechanism 32, which is adapted to release an internal pressure or temperature of the battery cell 7 when the internal pressure or temperature of the battery cell 7 reaches a predetermined value. For example, the pressure relief mechanism 32 is located between the positive electrode terminal and the negative electrode terminal, and can be a component such as an explosion-proof valve, an explosion-proof disc, a gas valve, a pressure relief valve, and a safety valve.

In some embodiments, the shell 20 may further be formed as a hollow structure with openings on two opposite sides. Two cap assemblies 30 are provided, which respectively cover and close the shell 20 at the two openings and are connected to the shell 20 in a sealing manner, so as to form the containing cavity for accommodating the electrode unit 10 and the electrolyte. In some examples, the positive electrode terminal and the negative electrode terminal may be installed on the same cap assembly 30. In other examples, the positive electrode terminal and the negative electrode terminal are installed on the two cap assemblies 30, respectively.

Figure 4:
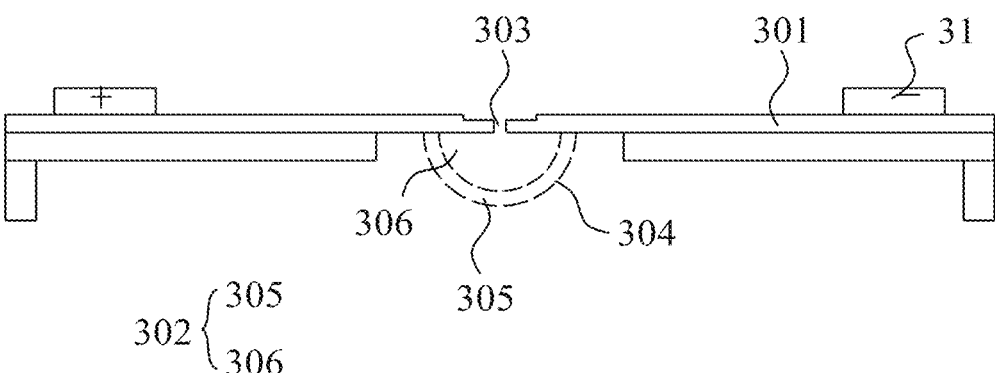
FIG. 4 is a structural schematic diagram of a cap assembly provided in some embodiments of the present application.
Figure 5:
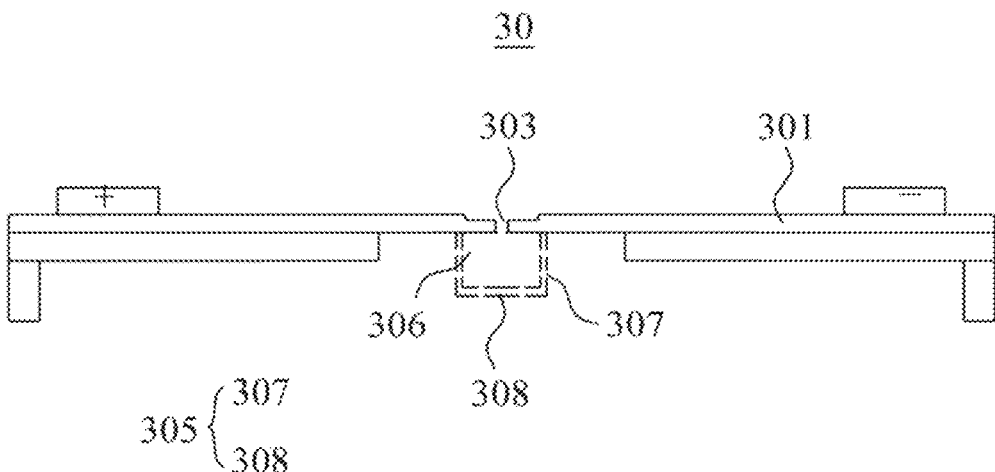
FIG. 5 is a structural schematic diagram of a cap assembly provided in some other embodiments of the present application.
Figure 6:
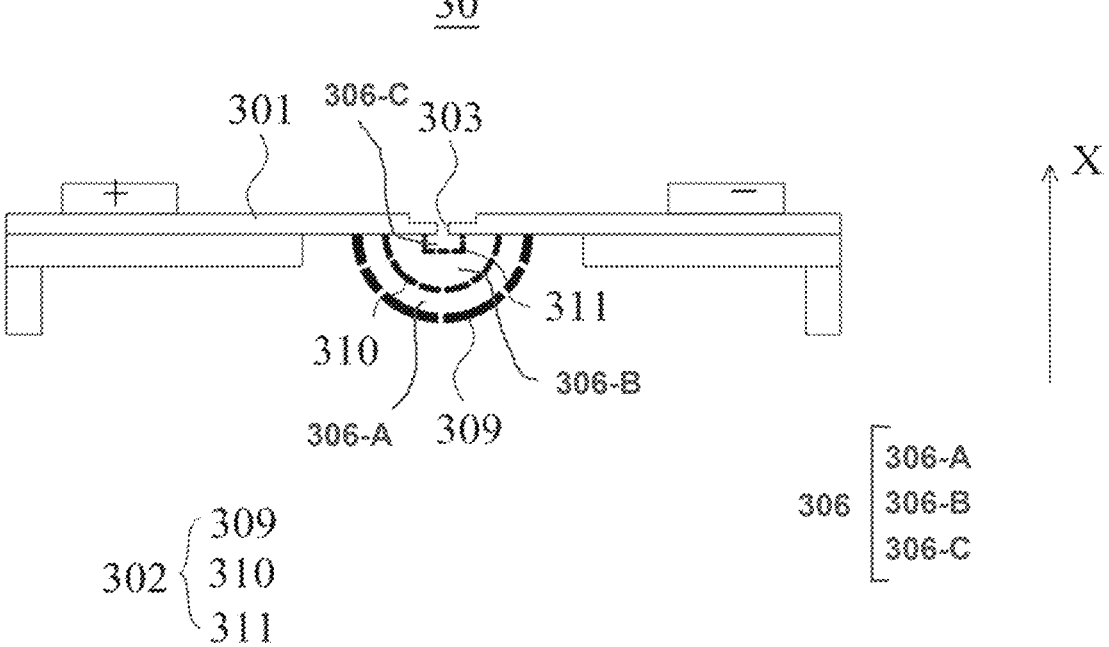
FIG. 6 is a structural schematic diagram of a cap assembly provided in some further embodiments of the present application.
Figure 7:
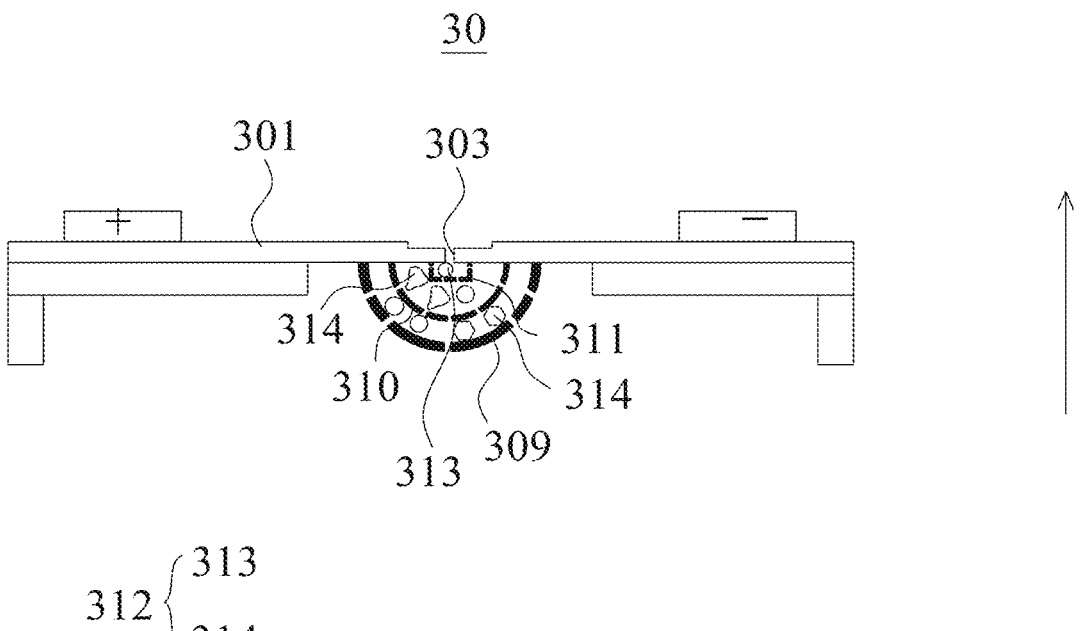
FIG. 7 is a structural schematic diagram of a cap assembly provided in some further embodiments of the present application.
Figure 8:
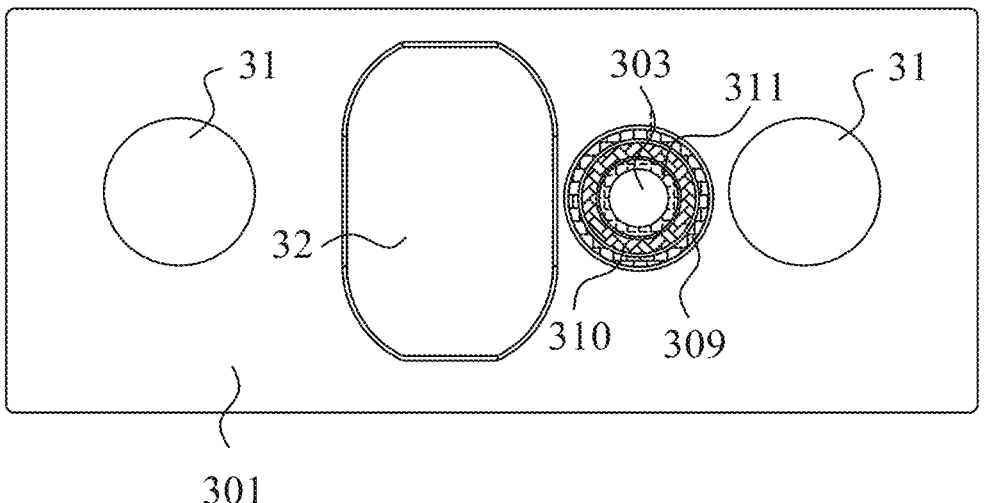
FIG. 8 is a structural schematic diagram of a cap assembly in a top view in some embodiments of the present application.

Please continue to refer to FIGS. 4 to 8, where FIG. 4 is a structural schematic diagram of the cap assembly 30 provided in some embodiments of the present application, FIG. 5 is a structural schematic diagram of the cap assembly 30 provided in some other embodiments of the present application, FIG. 6 is a structural schematic diagram of the cap assembly 30 provided in some further embodiments of the present application, FIG. 7 is a structural schematic diagram of the cap assembly 30 provided in some further embodiments of the present application, and FIG. 8 is a structural schematic diagram of the cap assembly 30 of the battery 2 in a top view in some embodiments of the present application.

As shown in FIGS. 2 to 6, the cap assembly 30 in the embodiments of the present application includes: a cap plate 301 and a blocking device 302. The cap plate 301 includes a liquid injection hole 303. The blocking device 302 is disposed on a side of cap plate 301 facing the electrode assembly 11 of the battery cell 7 and at least partially covers the liquid injection hole 303. The blocking device 302 includes a vent hole 304, which is adapted to communicate the liquid injection hole 303 with a space located at a side of the blocking device 302 facing away from the cap plate 301. The blocking device 302 includes a blocking plate 305, which is connected with the cap plate 301, and is provided with the vent hole 304 penetrating through the blocking plate 305. A plurality of blocking plates 305 are provided, and the plurality of blocking plates 305 are spaced apart in a first direction X, the first direction X is a direction from the electrode assembly 11 towards the cap plate 301.

The cap plate 301 is a component in the battery cell 7 for connecting with the shell 20 to form a space for accommodating the electrode assembly 11. The cap plate 301 is generally made of metal materials, and can be formed in a plate-like structure of strip type. The cap plate 301 is connected to the shell 20 in a sealing manner to prevent leakage of the electrolyte. The cap plate 301 itself also has a certain strength to ensure stability of its shape and structure, and meanwhile ensure reliability of installation of the blocking device 302. The cap plate 301 can be made of materials the same as the shell 20. For example, the cap plate 301 can be made of materials such as copper, aluminum, iron, stainless steel, and aluminum alloy. The liquid injection hole 303 is disposed on the cap plate 301, and the liquid injection hole 303 penetrates through the cap plate 301 in a thickness direction thereof and is communicated with a space in an interior of the shell 20. When injecting electrolyte, the liquid injection hole 303 is connected with a liquid injection device to inject the electrolyte into the shell 20. During the formation process, the liquid injection hole 303 is connected with the negative pressure mechanism to discharge redundant gases from the shell 20.

The blocking device 302 is disposed inside the battery cell 7 and connected with the cap plate 301. The blocking device 302 may be a plate-like structure covering the liquid injection hole 303 immediately below the liquid injection hole 303, or a gap may be provided between the blocking device 302 and the liquid injection hole 303. The blocking device 302 may be made of plastic cement, or may be made of resin, plastic material, rubber or metal material. Moreover, the materials for making the blocking device 302 is required to be resistant to corrosion of the electrolyte and high temperature, so as to prevent the blocking device 302 from being corroded by the electrolyte or being melted due to the high temperature during the formation process.

In the technical solutions of the embodiments of the present application, by providing the blocking device 302 below the liquid injection hole 303, the electrolyte is blocked during the formation process of the battery cell 7 to prevent it from flowing out directly through the liquid injection hole 303, and loss of the electrolyte during the formation process is effectively reduced. Moreover, when injecting the electrolyte through the liquid injection hole 303, the blocking device 302 can further buffer the injection of the electrolyte, thereby preventing the injected electrolyte from directly spraying onto the electrode assembly 11 and thus causing displacement or deformation of the electrode assembly 11, and improving safety of the electrolyte injection process. By providing the blocking plate 305, at least part of the electrolyte can be blocked from flowing out through the liquid injection hole 303. Moreover, by providing the vent hole 304 on the blocking plate 305, the gases inside the battery cell 7 can be discharged. The above configuration can ensure normal discharge of gases while reducing loss of the electrolyte. Also, the blocking plate 305 has a simple structure, can be conveniently manufactured, and can be applied to the liquid injection hole 303 of most structures.

In some embodiments, the blocking plate 305 may be fitted to the cap plate 301, a plurality of vent holes 304 may be provided, the plurality of vent holes 304 are all disposed below the liquid injection hole 303, and apertures of the vent holes 304 are smaller than an aperture of the liquid injection hole 303. Therefore, in the above embodiments, a flow velocity of the electrolyte flowing from the liquid injection hole 303 to the shell 20 can be buffered to a certain extent, and meanwhile the gases can be discharged smoothly.

In some embodiments of the present application, the blocking plate 305 includes a receiving cavity 306 on a side facing the cap plate 301, and an orthographic projection of the receiving cavity 306 on the cap plate 301 at least partially covers the liquid injection hole 303. Optionally, the orthographic projection of the receiving cavity 306 on the cap plate 301 completely covers the liquid injection hole 303. The receiving cavity 306 is formed between the blocking plate 305 and the cap plate 301, and is communicated with the liquid injection hole 303 and the vent hole 304, respectively. The receiving cavity 306 can be a buffer space between the liquid injection hole 303 and the vent hole 304.

By providing the receiving cavity 306, during the formation process, a portion of the refluxed electrolyte or condensed electrolyte gas can be temporarily stored and flow back into the shell 20 through the vent hole 304, thereby reducing loss of the electrolyte. Moreover, the receiving cavity 306 can accommodate the electrolyte during the electrolyte injection process, prevent the injected electrolyte from directly spraying towards the electrode assembly 11, and thus reduce the impact damage of the electrode assembly 11 caused by the electrolyte.

In some embodiments of the present application, as shown in FIG. 5, the blocking plate 305 includes a side plate 307 and a bottom plate 308, the side plate 307 is disposed around an outer periphery of the liquid injection hole 303, the bottom plate 308 is connected to the side plate 307 and opposite to the liquid injection hole 303, and the side plate 307 and the bottom plate 308 enclose and form the receiving cavity 306 in a cylindrical shape.

After injecting the electrolyte into the battery cell 7, it is required to seal the liquid injection hole 303 with a sealing nail. The sealing nail may be connected with the liquid injection hole 303 by welding or by other means. However, when the battery cell 7 moves or is subjected to external impacts, the sealing nail may fall off. The sealing nail that falls off may move during the formation process and rub with the blocking device 302, thereby causing damage of the blocking device 302. When the blocking device 302 is worn to generate a through-hole of a larger size, the sealing nail may enter the interior of the shell 20 via the through-hole and may damage the electrode assembly 11.

Therefore, by providing the cylindrical receiving cavity 306 which is similar to the scaling nail in shape, the sealing nail can be accommodated and prevented from moving. Therefore, the cylindrical receiving cavity 306 in the present application can prevent the sealing nail from falling into the shell 20, and avoid damage of the blocking plate 305 caused by movements of the sealing nail during the electrolyte injection or vacuuming in the formation process, thereby improving safety of the blocking device 302.

In some embodiments of the present application, a plurality of vent holes 304 is provided. By providing the plurality of vent holes 304 on the blocking plate 305, the area for gas discharge can be increased and efficiency of the gas discharge during the formation process can be improved.

In some embodiments of the present application, a plurality of vent holes 304 are arranged at uniform intervals on the blocking plate 305. The above configuration allows gases to be uniformly discharged through the blocking plate 305, can ensure a balanced force on the blocking plate 305, and meanwhile can improve efficiency of the gas discharge and extend service life of the blocking plate 305.

In some embodiments, as for example illustrated in FIG. 6, the blocking device 302 includes a first blocking plate 309, a second blocking plate 310, and a third blocking plate 311 arranged sequentially in the first direction X. The first blocking plate 309 and the second blocking plate 310 are both formed as hemispherical structures, which occupy less space and can effectively reduce the space occupied by the blocking device 302 in the interior of the shell 20. The third blocking plate 311 is formed as a cylindrical structure, which can accommodate the sealing nail while blocking the electrolyte from flowing away. Within the embodiment shown in FIG. 6 utilizing a plurality of blocking plates (i.e., first blocking plate 309, second blocking plate 310, third blocking plate 311) the blocking plates form: a first sub-cavity 306-A defined between the first blocking plate 309 and the second blocking plate 310; a second sub-cavity 306-B defined between the second blocking plate 310 and (at least) the cap plate 301. The second sub-cavity 306-B may also be defined by the third blocking plate 311 (if utilized), and there may be a third sub-cavity 306-C defined between the third blocking plate 311 and the cap plate 301. The first, second, and third sub-cavities (306A-C) together collectively constitute and define the overall first receiving cavity 306.

In some embodiments, diameters of the plurality of blocking plates 305 decrease gradually in the first direction X. It can be understood that the first blocking plate 309, the second blocking plate 310, and the third blocking plate 311 can further be formed as structures with similar shapes while different sizes. For example, all of the first blocking plate 309, the second blocking plate 310, and the third blocking plate 311 may be formed as cylindrical structures, or all of the first blocking plate 309, the second blocking plate 310, and the third blocking plate 311 may be formed as hemispherical or semi-ellipsoidal structures. The above structures may be selected based on actual usage, and there are no limitations here.

In the embodiments of the present application, by providing a plurality of blocking plates 305, multiple blocking measures are provided to prevent discharge of the electrolyte during the formation process, further reducing loss of the electrolyte. Meanwhile, during the electrolyte injection process, the injected electrolyte is buffered and slowed down multiple times, thereby achieving the purpose of protecting the electrode assembly 11.

In some embodiments of the present application, diameters of the blocking plates 305 decrease gradually in the first direction X. The blocking plates 305 are all formed as hemispherical structures, and the diameters of the plurality of blocking plates 305 that are stacked, decreases gradually. Optionally, centers of the plurality of blocking plates 305 are located on the same straight line.

The above configuration can divide the receiving cavity 306, and ensure a certain receiving space between adjacent two blocking plates 305, so as to improve efficiency of the gas discharge; meanwhile, it can facilitate connections of the blocking plates 305 with the cap plate 301 in a circumferential direction, thereby improving reliability of installation of the blocking device 302

In some embodiments of the present application, a quantity Q of the blocking plates 305 is in a range of 2≤Q≤5. If the quantity of blocking plates 305 is less than 2, the effect of blocking the electrolyte is not significant, and some loss of electrolyte still will occur at the liquid injection hole 303. If the quantity of blocking plates is more than 5, the occupied space in the interior of the battery cell 7 is too large and the blocking plates 305 cannot be installed. Therefore, by providing a reasonable quantity for the blocking plates 305, the blocking effect can be ensured, while a weight of the cap assembly 30 can be reduced and energy density of the battery cell 7 can be ensured.

In some embodiments of the present application, the vent holes 304 on adjacent two blocking plates 305 are arranged in a staggered manner. By providing the staggered vent holes 304, a path of the electrolyte flowing between adjacent blocking plates 305 is extended, and a discharge velocity of the electrolyte is reduced. Meanwhile, a flow path of gases generated by evaporation of the electrolyte also can be extended, thereby improving condensation efficiency of the vaporized electrolyte, and further reducing loss of the electrolyte.

In some embodiments of the present application, all the vent holes 304 on a same blocking plate 305 have a same aperture size, wherein the aperture size of the vent holes 304 decrease gradually in the first direction X from one blocking plate to another. This feature causes the aperture size of the vent holes 304 to gradually decrease in a discharging direction of the electrolyte. It follows that a resistance to the electrolyte when the electrolyte is discharged is gradually increased along the discharging direction of the electrolyte, which allows reducing amounts of the discharged electrolyte.

In some embodiments of the present application, as shown in FIG. 7, the blocking device 302 further includes a liquid absorbing assembly 312 located within the receiving cavity 306, and the liquid absorbing assembly 312 is formed as a structure with multiple holes. The liquid absorbing assembly 312 can absorb or block the splashed electrolyte, so that a portion of the electrolyte flows back into the shell 20 and a portion of the electrolyte is temporarily absorbed into the structure with multiple holes of the liquid absorbing assembly 312. By providing the liquid absorbing assembly 312 in the receiving cavity 306, the electrolyte can be temporarily stored in the holes of the liquid absorbing assembly 312, and the electrolyte can flow back after the formation process is completed, thereby reducing loss of the electrolyte during the formation process.

In some embodiments of the present application, the liquid absorbing assembly 312 includes a first liquid absorb-ing piece 313 located between the blocking plate 305 and the liquid injection hole 303, the first liquid absorbing piece 313 is provided with a plurality of liquid absorbing holes on its surface, and the first liquid absorbing piece 313 has a size larger than the aperture of the liquid injection hole 303.

The first liquid absorbing piece 313 may be made of materials resistant to corrosion of the electrolyte and high temperature, to avoid from being corroded by the electrolyte, or to prevent from being melted during the formation process. For example, the first liquid absorbing piece 313 may be made of plastic cement, or may be made of resin, plastic material, rubber or metal material. Exemplarily, when the first liquid absorbing piece 313 is made of metal aluminum material, the aluminum material can be made into the first liquid absorbing piece 313 with regular or irregular shapes, and multiple concave liquid absorbing holes may be provided on a surface of the aluminum material to absorb the electrolyte.

By providing the first liquid absorbing piece 313 of a structure with multiple holes, the ability of the blocking device 302 to absorb the electrolyte can be increased and the effect of blocking the electrolyte from flowing away can be improved. Moreover, by providing the size of the first liquid absorbing piece 313 to be larger than the aperture of the liquid injection hole 303, the first liquid absorbing piece 313 can be prevented from being discharged from the liquid injection hole 303.

In some embodiments of the present application, the liquid absorbing assembly 312 includes a second liquid absorbing piece 314 located between adjacent two blocking plates 305, the second liquid absorbing piece 314 is provided with a plurality of liquid absorbing holes on its surface, and the second liquid absorbing piece 314 has a size larger than the apertures of the vent holes 304 on the adjacent two blocking plates 305.

The second liquid absorbing assembly 314 is required to be made of materials resistant to corrosion of the electrolyte and high temperature, to avoid from being corroded by the electrolyte, or to prevent from being melted during the formation process. For example, the second liquid absorbing piece 314 may be made of plastic cement, or may be made of resin, plastic material, rubber or metal material. Exemplarily, when the second liquid absorbing piece 314 is made of metal aluminum material, the aluminum material can be made into the second liquid absorbing piece 314 with regular or irregular shapes, and multiple concave liquid absorbing holes may be provided on a surface of the aluminum material to absorb the electrolyte.

By providing the second liquid absorbing piece 314 of a structure with multiple holes, the ability of the blocking device 302 to absorb the electrolyte can be increased and the effect of blocking the electrolyte from flowing away can be improved. Moreover, by providing the size of the second liquid absorbing piece 314 to be larger than the apertures of the vents 304, the second liquid absorbing piece 314 can be prevented from falling off through the vent holes 304, thereby preventing the second liquid absorbing piece 314 from damaging the electrode assembly 11.

The embodiments of the present application further provides a battery cell 7 including a cap assembly 30. The cap assembly 30 includes a cap plate 301 and a blocking device 302. The cap plate 301 includes a liquid injection hole 303; the blocking device 302 is disposed on a side of the cap plate 301 facing the electrode assembly 11 of the battery cell 7 and at least partially covers the liquid injection hole 303, the blocking device 302 includes a vent hole 304, the vent hole 304 is adapted to communicate the liquid injection hole 303 with a space located at a side of the blocking device 302 facing away from the cap plate 301.

The embodiments of the present application further provide a battery 2, and referring to FIGS. 2 and 4, the battery 2 includes: the battery cell 7 in any of the above embodiments.

The embodiments of the present application further provide an electric-powered device, which includes the battery 2 in any of the above embodiments, and the battery 2 is adapted to provide electrical energy.

Since both the battery 2 and the electric-powered device as mentioned above are provided with the cap assembly 30 in the present application, they can achieve the following technical effects:

In the battery 2 and the electrical device provided by the embodiments of the present application, by providing the blocking device 302 below the liquid injection hole 303, the electrolyte can be blocked and prevented from directly flowing out through the liquid injection hole 303 during the formation process. Moreover, when injecting the electrolyte through the liquid injection hole 303, the injected liquid is prevented from directly spraying onto the electrode assembly 11 and thus causing displacement or deformation of the electrode assembly 11, thereby improving safety of the liquid injection process.

Although the present application has been described with reference to detailed embodiments, various improvements can be made and equivalent components can be replaced without departing from the scope of the present application. In particular, as long as there is no structural conflict, the various technical features mentioned in the various embodiments can be combined in any way. The present application is not limited to the specific embodiments disclosed herein, but includes all technical solutions falling within the scope of the claims.

What is claimed is:

1. A battery cell comprising:
an electrode assembly; and
a cap assembly, the cap assembly comprising:
  a cap plate comprising a liquid injection hole; and
  a blocking device disposed on a side of the cap plate facing the electrode assembly and at least partially covering the liquid injection hole, the blocking device comprising at least:
    a first blocking plate that forms a first receiving cavity and that is connected with the cap plate along a first peripheral edge of the first blocking plate that surrounds the liquid injection hole; and
    a second blocking plate that is connected with the cap plate along a second peripheral edge of the second blocking plate arranged between the first peripheral edge and the liquid injection hole;
  wherein the first receiving cavity comprises a first sub-cavity defined between the first blocking plate and the second blocking plate and a second sub-cavity defined between the second blocking plate and the liquid injection hole;
  wherein each blocking plate is provided with a vent hole which penetrates through the blocking plate, each vent hole being adapted for communicating the liquid injection hole with a space located at a side of the blocking device facing away from the cap plate; and wherein each of the blocking plates are spaced apart in a first direction, and the first direction is a direction from the electrode assembly towards the cap plate.

2. The battery cell according to claim 1, wherein each blocking plate comprises a side plate and a bottom plate, the side plate being disposed around an outer periphery of the liquid injection hole, the bottom plate being connected to the side plate and opposite to the liquid injection hole, wherein the side plate and the bottom plate of each blocking plate give a cylindrical shape to the respective sub-cavity of each blocking plate.

3. The battery cell according to claim 1, wherein each blocking plate is provided with a plurality of vent holes.

4. The battery cell according to claim 3, wherein the plurality of vent holes of each blocking plate are arranged on each blocking plate, respectively, at uniform intervals.

5. The battery cell according to claim 3, wherein respective diameters of the plurality of blocking plates decrease in the first direction.

6. The battery cell according to claim 3, wherein a quantity Q of the blocking plates is in range of $2 \leq Q \leq 5$.

7. The battery cell according to claim 5, wherein the plurality of vent holes on the first and second blocking plates are arranged in a staggered manner so as to extend a path of an electrolyte flowing in said first sub-cavity through the plurality of vent holes.

8. The battery cell according to claim 7, wherein each vent hole of the plurality of vent holes on a same blocking plate has a same aperture, and wherein the plurality of vent holes on the first blocking plate are larger in size than the plurality of vent holes on the second blocking plate.

9. The battery cell according to claim 1, wherein the blocking device further comprises a liquid absorbing assembly disposed in at least one of the second sub-cavity and the first sub-cavity, and the liquid absorbing assembly is formed as a structure with multiple holes.

10. The battery cell according to claim 9, wherein the liquid absorbing assembly comprises a first liquid absorbing piece disposed in the second sub-cavity between the second blocking plate and the liquid injection hole, the first liquid absorbing piece being provided with a plurality of liquid absorbing holes on its surface, and the first liquid absorbing piece having a size larger than an aperture of the liquid injection hole.

11. The battery cell according to claim 10, wherein the liquid absorbing assembly comprises a second liquid absorbing piece disposed in the first sub-cavity, between the first and second blocking plates, the second liquid absorbing piece being provided with a plurality of liquid absorbing holes on its surface, and the second liquid absorbing piece having a size larger than the apertures of the vent holes on the first and second blocking plates.

12. An electric-powered device, comprising the battery cell according to claim 1, wherein the battery is adapted to provide electrical energy.

* * * * *